UNITED STATES PATENT OFFICE.

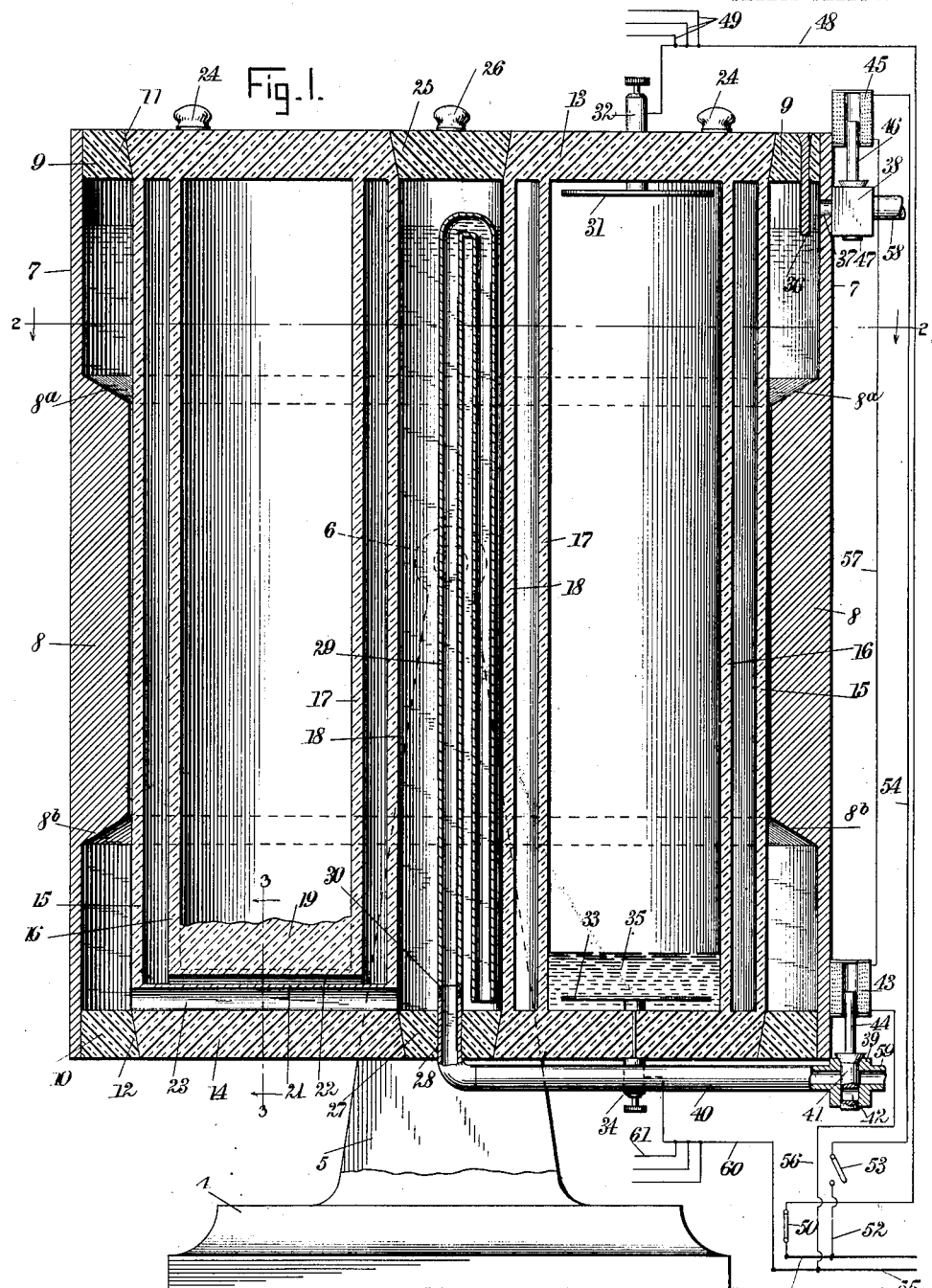

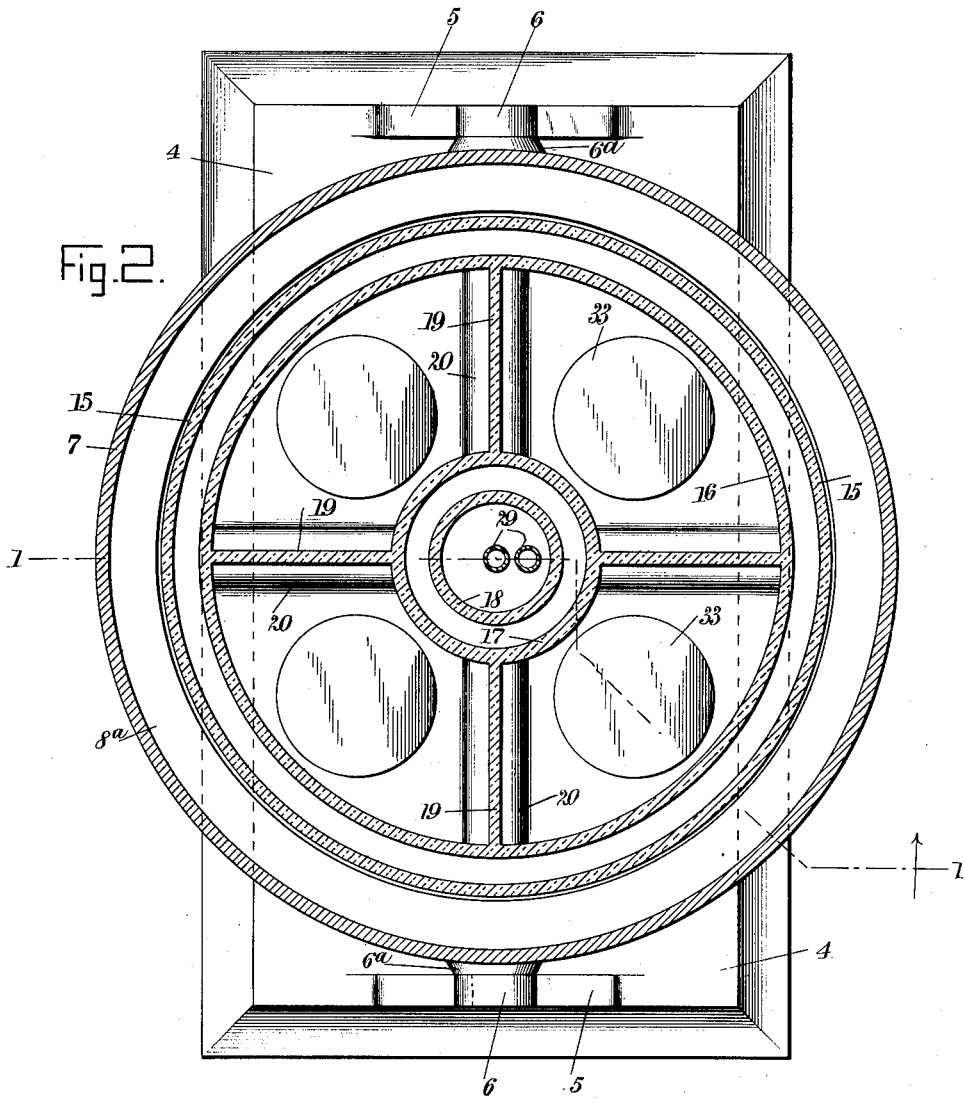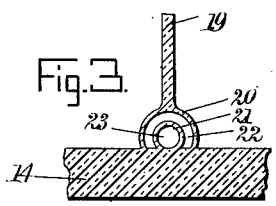

JOSEPH F. ARMSTRONG, OF NEW YORK, N. Y., ASSIGNOR OF ONE-HALF TO SIMON GINSBERG, OF NEW YORK, N. Y.

STERILIZING APPARATUS.

1,056,619.   Specification of Letters Patent.   Patented Mar. 18, 1913.

Application filed May 26, 1911. Serial No. 629,631.

*To all whom it may concern:*

Be it known that I, JOSEPH F. ARMSTRONG, a citizen of the United States, and a resident of the city of New York, borough of Manhattan, in the county and State of New York, have invented a new and Improved Sterilizing Apparatus, of which the following is a full, clear, and exact description.

My invention relates to the sterilization of liquids by aid of ultra-violet light rays, my more special purpose being to thus sterilize milk in order to render it sanitary and promote its preservation.

More particularly stated, my sterilizing apparatus is so constructed and operated as to cause milk to flow along a path of considerable length, and to expose said milk to the action of ultra-violet light rays.

My invention further comprehends, for this purpose, an improved form of mercury vapor lamp for producing the ultra violet rays.

My invention still further contemplates the protection of the vapor lamp from injury by contact with the milk in consequence of certain parts of the lamp being heated.

My invention also includes a number of separate improvements whereby the various portions of the apparatus are rendered more readily accessible to the operator.

Reference is to be had to the accompanying drawings forming a part of this specification, in which similar characters of reference indicate corresponding parts in all the figures.

Figure 1 is a vertical section, substantially on the line 1—1 of Fig. 2, looking in the direction of the arrow, and showing my improved sterilizing apparatus as a whole; Fig. 2 is a section on the line 2—2 of Fig. 1, looking in the direction of the arrow; and Fig. 3 is a fragmentary section on the line 3—3 of Fig. 1, looking in the direction of the arrow, and showing the manner in which certain parts of the apparatus are brought into communication with other parts thereof, in order to allow a free circulation of the milk and equalization of the vacuum pressure in different parts of the apparatus.

Extending upwardly from a base 4 are pedestals 5 supporting at their tops annular bearings 6. Engaging these bearings are trunnions 6ª which support a vessel 7 having generally a cylindrical form and provided with a thickened wall 8. The vessel 7 and its thickened wall 8 may be made of any suitable material, but in this instance are shown as of metal. The thickened wall 8 is provided with bevel surfaces 8ª, 8ᵇ and has generally an annular form, as will be understood from Fig. 1. An annular head 9 is fitted into the upper end of the vessel 7 and is made of glass. An annular head 10 is fitted into the lower end of the vessel 7 and forms a part of the bottom thereof. The inner surface of the annular head 9 is shown at 11 and is inclined slightly—that is, rendered slightly conical. The inner surface 12 of the annular head 10 is also slightly conical, as will be understood from Fig. 1. At 13 is an annular head, the outer surface of which mates the inner surface 11 of the annular head 9, and at 14 is an annular head, the outer edge of which mates the adjacent surface 12 of the annular head 10. A cylinder 15, of quartz glass, German glass, or other material transparent to ultra-violet rays, is fused to the annular heads 13, 14. Disposed concentrically within the cylinder 15 is another cylinder 16 made also of material transparent to ultra-violet rays. The spacing between the cylinders 15, 16 is uniformly distributed. These cylinders are integral with the annular heads 13, 14—a result easily accomplished because all of the parts affected are of glass, the only difference being that the heads 13, 14, being of ordinary glass, are opaque to ultra-violet rays. Similarly, cylinders 17, 18, of glass transparent to ultra-violet rays, are fused to the heads 13, 14. The cylinder 18 is smaller than the cylinder 17. A number of walls 19, of glass preferably transparent to ultra-violet rays, extend from the head 13 to the head 14 and divide into compartments the space existing between the cylinders 16, 17. In this particular instance I provide four of these walls 19, thus dividing the annular space in question into quarters, as will be understood from Fig. 2.

Mounted upon the annular head 14 and disposed radially in relation to each other are a number of conduits 20, each having in section an arch-like form, as will be understood from Fig. 3. Mounted upon the respective conduits 20 are tubular members 21, each tubular member 21 being concentric with the conduit 20 with which it is associated. Between each tubular member 21 and the conduit 20 through which it extends is a space 22 having generally the form of an arch, as will be understood from Fig. 3. Each tubular member 21, because of its tubular form, is provided with a straight passage 23, this passage being substantially concentric with the adjacent passage 22. Each passage 22 extends from the cylinder 16 to the cylinder 17 and through these cylinders, thus merging into the annular space between the cylinders 15, 16, and also merging into the annular space between the cylinders 17, 18. The conduit 20 and the tubular member 21 are both made of glass transparent to ultra-violet rays. The upper surface of each conduit 20 merges into the adjacent wall 19, as will be understood from Fig. 3.

The annular head 13 is provided with handles 24, by aid whereof the head and all other parts connected with it may be lifted bodily upward. The annular head 13 is provided centrally with an opening of frusto-conical form, and detachably fitting into this opening is a plug 25 of glass provided with a handle 26. Another plug 27, having likewise a substantially frusto-conical form, is fitted into an opening in the annular head 14, this opening being for this purpose of a frusto-conical form. A pipe section 28 extends upwardly through the plug 27. A substantially U-shaped tube 29 made of glass transparent to ultra-violet rays is connected with the pipe section 28 by aid of a screw joint 30. I provide a number of electrodes 31 made of carbon or other appropriate conducting material. Each electrode is connected with a particular binding post 32 and is supported directly by the annular head 13. I provide other electrodes 33 which are disposed in close proximity to the head 14 and supported thereby. The electrodes 33 are connected with binding posts 34. The electrodes 31, 33 are of disk-like form and are disposed within the respective compartments between the radial walls 19, and also between the cylinders 16, 17, as will be understood from Fig. 2. In each of these compartments is a quantity of mercury 35 in which the electrode 33 is submerged. A baffle plate 36 of metal extends through the annular head 13 and adjacent to an opening 37. A valve casing 38 is mounted upon the vessel 7 and controls the opening 37. Another valve casing 39 is connected with a pipe section 40 which joins the pipe section 28. A valve plug 41 is provided with an opening 42 which is adapted to register with the passage through the pipe section 40. A solenoid 43 is mounted above the valve casing 39 and is provided with a movable core 44 which is connected directly with the valve plug 41. Whenever the solenoid 43 is energized, the core 44 is lifted, carrying with it the valve plug 41, the opening 42 of which is thus brought into registry with the passage of the pipe section 40. Another solenoid 45 is provided with a movable core 46 which is connected rigidly with a valve plug 47 and is adapted to lift the same whenever the solenoid 45 is energized. The mechanism in the two valve casings 38, 39 is identical. A wire 48 is connected with a number of wires 49 and leads to a binding post 32, the wires 49 leading to various other binding posts, not shown, and disposed in corresponding positions to the binding post 32. The wire 48 is also connected with a hand switch 50, the latter being connected with an alternating main 51. Connected with this main is a wire 52 which leads to a hand switch 53. From the latter a wire 54 leads to the solenoid 45. Another alternating current main is shown at 55. A wire 56 leads from it to the solenoid 43 and from the latter a wire 57 extends to the solenoid 45. A pipe 58 is connected with the valve casing 38 and is used for supplying the milk to be sterilized. A pipe 59 is connected with the valve casing 39 and leads to a vessel for receiving the sterilized milk. A wire 60 is connected with the alternating main 55 and with the binding post 34. Several other wires 61 are connected with the wire 60 and lead to the other various binding posts (not shown) corresponding with the binding post 34.

The annular space between the cylinders 15, 16 is a vacuum; that is, the air is exhausted from it as nearly as possible. This vacuum, acting upon the principle of the well-known thermos bottle, prevents heat from the cylinder 16 from being communicated to the milk. It also prevents the milk (which is comparatively cold) from cracking the cylinder 16 which, because of the material of which it is composed, might otherwise be very easily broken by inequalities in heat. The four quarters of the cylinder 16 and the four partitions 19 for subdividing the interior of this cylinder 16 into quarters, practically subdivide the cylinder 16 and its contents into four quartz glass elements each working upon the principle of a mercury vapor vacuum lamp.

The operation of my apparatus is as follows: The hand switches 50, 53 are first closed. This closes an electric circuit which may be traced as follows: alternating main 55, wire 56, solenoid 43, wire 57, solenoid 45, wire 54, hand switch 53, wire 52, to alternating main 51, thence to source of supply and back to alternating main 55. This energizes the two solenoids 43, 45 and by causing them to lift their respective cores 46, 44, the valve plugs 47, 41 are raised. The result is that the milk flows freely into the vessel 7 through the pipe 58, and milk is free to flow out through the pipe 40 and opening 42 in the valve plug 41, as hereinafter described. Another circuit is also closed as follows: alternating main 55, wire 60, binding post 34, electrode 33, mercury 35, vacuum space above this electrode, electrode 31, binding post 32, wire 48, switch 50, alternating main 51, to source of supply (not shown), thence back to alternating main 55. As the wires 49 branch from the wire 48 and are connected with other electrodes positioned similarly to the electrode 31, and as the wires 61 branch from the wire 60 and are connected to binding posts similar to the binding post 34, it follows that the current may be distributed in parallel to several electrodes 31, and that it passes thence to the adjacent bodies of mercury 35. The next step is to tilt the vessel 7 so that the mercury 35 is brought into engagement with the electrodes 31. This tilting is done by virtue of the fact that the vessel 7 is mounted upon trunnions 6ª which turn within the annular bearings 6. The vessel having been tilted so that the several currents flow through the vacuum spaces, the apparatus can do the work of a number of mercury vapor tubes. The milk from the pipe 58, after passing through the valve casing 38 and openings 37, flows against the baffle plate 36 and then spreads out and flows downwardly, filling up the compartment into which it has entered, and passing downwardly along the inner surface of the thickened wall 8 is exposed to strong radiation. That is to say, the ultra-violet light passing readily through the cylinders 16, 15, and the vacuum space between them enters the thin layer of milk between the cylinder 15 and the thickened wall 8, being thus completely sterilized. The milk now passes downwardly to the proximate bottom of the vessel 7 and flows through the passages 23 in the conduit 20, thence into the cylinder 18. Here it spreads out and flows in an indefinite direction, but for the most part flows upwardly and around the tube 29. The milk within the cylinder 18 circulates quite freely and is exposed to more radiation. Indeed, it is subjected to powerful radiation while in the act of passing through the conduit 20 and before entering the cylinder 18. The milk within the cylinder 18 upon reaching the level of the upper end of the U-tube 29 starts a siphoning action by this tube and passes downwardly through the pipe sections 28 and 30, valve casing 39 and pipe 59, to the vessel for receiving it. The milk is thus completely sterilized.

By removing the plug 25, the operator may insert his hand into the cylinder 18 and grasp the U-tube 29. By turning this U-tube he can disconnect the joint 30 and readily remove the U-tube. By disconnecting the pipe section 28 from the pipe section 40 and then raising the U-tube 29 by hand, the operator can lift the plug 27 along with the U-tube, completely out of the cylinder 18. Again, the operator, by grasping the handles 24, can lift all of the cylinders as a unit directly out of the vessel 7.

My purpose in rendering the various parts so readily accessible is to facilitate cleaning these parts. As the cores 46, 44 are raised simultaneously, the inlet and outlet for the milk are, of course, operated simultaneously, and consequently the milk within the vessel maintains a constant level. Nevertheless, for purposes of emptying and cleaning the apparatus, if the flow of milk through the pipe 58 be stopped, the apparatus is soon cleared of its contents by the action of the siphon.

It will be noted that as the milk passes along around the inner surface of the thickened wall 8, the milk is spread into a very thin layer and subjected to very intense radiation. The milk, while thus embodied in a thin layer, travels quite rapidly, however, so that the exposure is long at points above and below the thickened wall 8. I thus expose the milk practically in two ways—first, in a thick mass or volume moving or circulating slowly, and second, in a thin layer, the milk in this form circulating quite rapidly. Besides this, I give the milk various other exposures, especially when it passes through the conduits 20 and as it circulates within the cylinder 18 preparatory to entering the U-tube 29. As this tube is of glass transparent to ultra-violet rays, the milk receives a still further exposure in passing upwardly and then downwardly through the tube. Altogether the milk is exposed about half a dozen times to the radiation and is thus sterilized most effectively.

The action of the apparatus is largely automatic. The operation of the valve plugs 41, 47 being controlled electrically and the lamps being operated electrically, practically the entire action of the apparatus is electrical.

I do not limit myself to the particular construction shown, nor to the use of the particular materials enumerated, the scope of my invention being commensurate with my claims.

Having thus described my invention, I claim as new and desire to secure by Letters Patent:

1. A sterilizing apparatus, comprising a cylindrical member made of material transparent to ultra-violet rays, means for generating said ultra-violet rays and causing the same to pass into said cylinder, mechanism for causing milk to flow into said cylinder, a siphon located within said cylinder and leading outwardly from the same in order to draw off the liquid contained within said cylinder, and means for supplying said liquid into said cylinder.

2. A sterilizing apparatus, comprising a pair of cylinders concentric to each other, partition walls extending from one of said cylinders to the other so as to separate the intervening space into a plurality of compartments, said compartments containing vacuums, electrodes disposed within said vacuums, means for energizing said electrodes in order to generate ultra-violet rays, and mechanism for exposing a liquid to the action of said ultra-violet rays.

3. In a sterilizing apparatus, the combination of an outer vessel of substantially cylindrical form provided with annular heads, a plurality of lamps connected together and provided with annular heads mating said annular heads of said outer vessel so that said plurality of lamps, as a unit, may be placed within said vessel or removed therefrom at the will of the operator, and means for causing a liquid to flow between said outer vessel and said plurality of lamps.

4. In a sterilizing apparatus, the combination of an outer vessel of substantially cylindrical form, a cylinder disposed within said outer vessel and concentric to the same, lamps for generating ultra-violet rays disposed between said cylinder and said outer vessel and provided with walls through which ultra-violet rays may pass, conduits for maintaining communication from said cylinder to the space immediately within said outer wall, and means for circulating a liquid through said space, said conduits and said cylinder.

5. A sterilizing apparatus, comprising a cylinder made of material transparent to ultra-violet rays, said cylinder being adapted to hold milk, a siphon disposed within said cylinder, a plug engaging said siphon and removable therewith from said cylinder, a plug for closing said cylinder, and means for exposing said cylinder to the action of ultra-violet rays.

In testimony whereof I have signed my name to this specification in the presence of two subscribing witnesses.

JOSEPH F. ARMSTRONG.

Witnesses:
LUDWIG C. TRAUBE,
BARNEY FISCHER.